Figure 1:
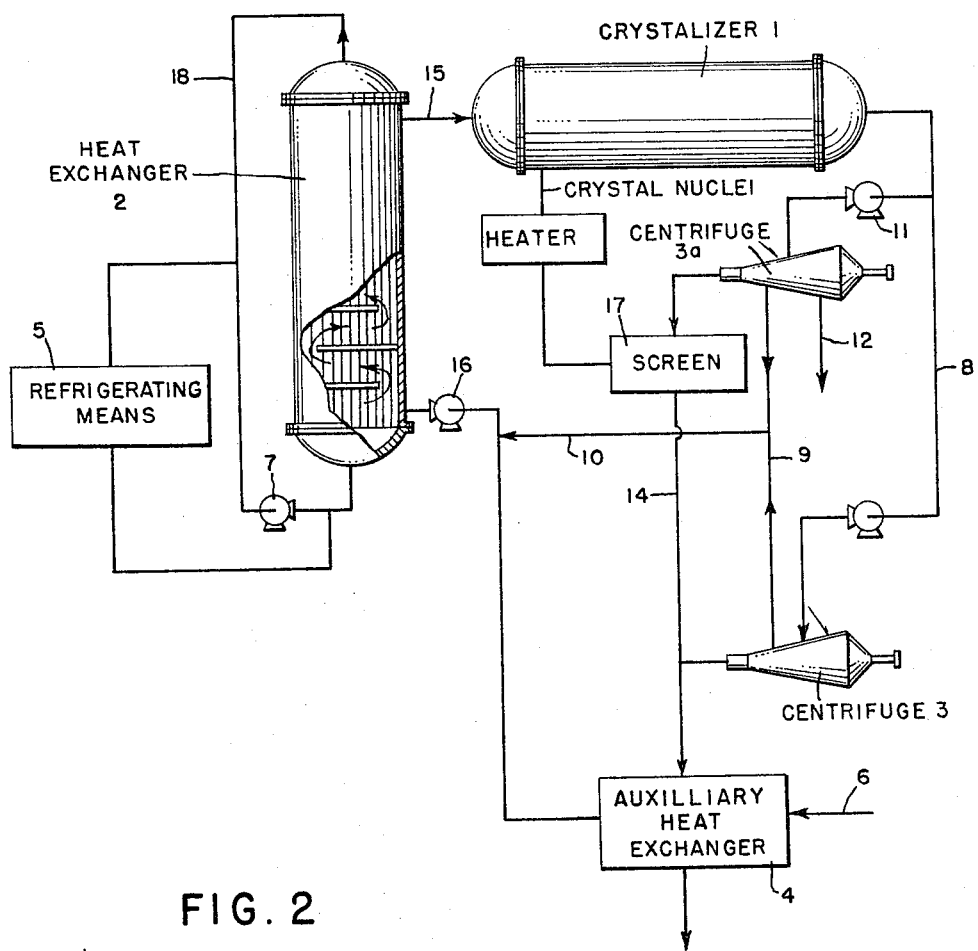
Figure 2:
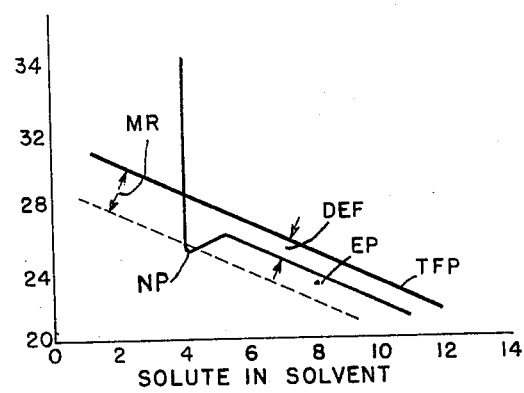

Nov. 15, 1966  J. W. PIKE  3,285,022

CONCENTRATION OF EXTRACTS BY FREEZING

Filed Jan. 8, 1963

INVENTOR.
JOHN W. PIKE

United States Patent Office 3,285,022
Patented Nov. 15, 1966

3,285,022
CONCENTRATION OF EXTRACTS BY FREEZING
John W. Pike, 80 Broadview Ave., New Rochelle, N.Y.
Filed Jan. 8, 1963, Ser. No. 250,190
5 Claims. (Cl. 62—58)

This invention relates generally to a process of subjecting solutions to solute concentration by crystallization and more particularly relates to freezing comestible extractions and to the concentration of solutes while removing the solvent through crystallization.

The prior art describes processes in which the solvent in certain solutions is frozen and the crystals formed separated, thus either concentrating the solution or liberating the solvent from the solution. In carrying out such processes in accordance with certain prior art disclosures, the solution may contact a heat transfer surface such, for example, as the surface of an internally cooled drum which is immersed in the solution, or may contact the inner surface of an externally refrigerated cylinder. The solvents of these solutions under prescribed conditions, freeze out the solutions in the form of ice on the cold surfaces of the heat exchanger. Other methods have been disclosed for the removal of the solvents by crystallization in which droplets of an immiscible liquid or particles of an insoluble solid, cooled below the freezing point of the solution are continuously introduced into the solution and the droplets or particles incased in the frozen solvent continuously removed from the solution. After removing the frozen solvent by liquifying with heat the droplets or particles are again cooled and the operation repeated.

In the processes of the art such as those briefly described above, efficient operation suffers due to the unconscionable amount of the concentrate that is carried away by the ice on or in the refrigerating drum or on or in the crystals formed and removed from the concentrate. Recovery of the concentrate, occluded or retained on the ice, by washing extraction or other means frequently dissolves the solvent crystals, thus diluting the concentrate. This reduces the economic value of such recovery steps. The process of the subject invention obviates these and other difficulties and advances the art of concentrating a solute by removing the solvent by an improved crystallization process.

Objects of the invention include: an improved process for the concentration of potable extracts and for the concentration of citrous liquids by a controlled crystallization process: the crystal and environmental control of such processes to produce and separate ice crystals from fruit, vegetable, and comestible extracts: the maintenance of a metastable environment in which to control the nucleation of ice crystals from potable liquids and comestible extracts and the subsequent growth of pure crystals of ice by disturbing the metastability: the concentration of solutes by freezing and an improved process of separating concentrates from ice, and the mixing of a dilute extract cooled below its freezing point (i.e. undercooled) to a temperature within the metastable state with a slurry of extract and ice, the undercooling being released as crystal growth on the crystals of the slurry while concurrently concentrating the extract. Other objects and advantages of the invention will hereinafter appear.

The process invention will be more readily understood by reference to the attached drawings in which like parts have like numbers throughout.

FIG. I represents, diagrammatically a process including, in an elevation view, a heat exchanger, in partial cutaway section, a crystallizer and other equipment used in the process of the invention in which a comestible extract, a potable liquor, or the like, and more particularly an extract made from vegetable or fruit tissue of various fruits, such as oranges, lemons etc., or fruit plants including the seed and seed-like fruit from cereal grass, as wheat, maize, oats, by expression, maceration, digestion, infusion with or without a suitable aqueous or non-aqueous solvent (hereinafter generally referred to as an extract or extracts), are concentrated to a more easily transported form for ultimate consumption as a concentrate or after dilution of a concentrate.

FIG. II represents a graph depicting the phrase changes and metastable state that occurs in freezing an aqueous extract. Temperatures in degrees Fahrenheit are plotted against percent solute in the extract, the line falling from 32° F. illustrates freezing point lowering of extract with increase of solute content. The freezing point of the particular extract is, in general, lower than that of the pure solvent and the depression is proportional to the active mass of the solute. The dotted line paralleling the theoretical freezing point line is the lower limit of the metastable zone, within which undercooling of an extract can be effected, if care is exercised, without crystallization. The curved line represents generally the temperature of cooling an extract initially containing about 4% solute, for example orange juice. From the theoretical freezing point of about 29° F. to a temperature of about 26.5° F. no crystals form in the solution providing a quiescent state exists and the concentration is held constant. Crystallization commences if quiescence is disturbed or the temperature falls below approximately 26.5° F. and the concentration of the extract increases due to loss of water to ice crystals. With crystals present in the extract the driving force of crystallization and crystal growth is proportional to the vertical distance between the theoretical freezing point, TFP, line, and the temperature of the extract.

The theoretical aspects of the invention can best be described by reference to FIG. II, which depicts the temperature and concentration of an extract during batch freezing.

After a solution containing dissolved solids in any solvent is cooled, it approaches the TFP line. Nuclei will not form at this line since there must be a driving force to produce the nuclei. After the solution is cooled sufficiently below the TFP line nuclei will form and the solution temperature will then rise due to the heat of fusion of ice. The actual solution temperature will remain below the TFP line if the crystallization is continued. The distance below the theoretical freezing point is the driving force required to form the ice crystals. The greater this distance, the faster the crystal growth rate. Nuclei will not form in the metastable range which varies depending on many conditions including the solid materials in the solution, impurities, rate of cooling and many other factors.

More specifically, the present invention comprises a process of continuously introducing a dilute extract, undercooled below its freezing point and within the metastable state, into a concentrating extract and ice slurry, releasing the undercooling to heat of crystallization in growth of ice on the crystals present in the slurry and thereby concentrating the extract. The water in the extract is changed from a liquid phase solvent to a solid phase by deposition of ice on the crystals of ice present in the slurry, thus expanding the size of the crystals and concentrating the extract. By maintaining carefully controlled conditions as described below during the heat transfer of the undercooling, dense pure ice crystals are formed without occluding the solute. Moreover, the solute retained on the surface of the crystals can be readily washed from the crystals after their separation from the concentrated extract.

FIG. I describes by a schematic flow sheet type of drawing a preferred embodiment of the invention, the drawing showing diagrammatically a crystallizer 1, a heat exchanger 2, centrifuges 3 and 3a, auxiliary heat exchanger 4, and refrigerating means 5. The process of the invention is operated by introducing an extract into the system through line 6, the extract comprising for example, fruit juices such as: orange, lemon, pear, grape, apple; vegetable juices e.g. tomato, carrot, cabbage, onion, and beet; and other comestible extractions; potable liquors such as alcohol bearing water solutions: wine, beer, whiskey, other aqueous solutions e.g. blood or protein bearing liquids, soups, root leaf or bean extracts such as medicines, tea and cocoa and coffee, vitamin extracts, pharmaceutical preparations and other heat sensitive liquids and any chemical solution which can be concentrated by removal of water. The extract passes through auxiliary heat exchanger 4 in which the temperature of the extract is lowered by indirect heat exchange contact with ice and ice water discharge from centrifuge 3, the cooled extract then passing into the heat exchanger 2. In heat exchanger 2 the extract is cooled by indirect heat exchange with a refrigerant from a circulating pump 7 and is cooled by any well known refrigerant means 5 from a phase stable to a metastable state. Thus cooled, the extract is then passed to the crystallizer 1 wherein the extract introduced into crystallizer 1 in the metastable state is commingled with a crystallizing slurry of extract and ice, and the undercooling of the extract released as crystal growth on the crystals present. The crystals grown in crystallizer 1 with the concentrated extract are discharged in the form of a slurry containing approx. 25% by weight ice to centrifuges 3 and 3a, the ice separated and washed. The extract separated from the ice in the centrifuge 3 together with the wash water are returned through line 9 to heat exchanger 2. A slurry of extract and crystals is bled-off of line 8 to centrifuge 3a by pump 11, the recovered concentrated extract is sent to storage through line 12 or to packaging and freezing by established quick freezing processes. The ice from centrifuge 3a is washed, the wash water returned to heat exchanger 2 through line 10, the ice is transferred to screen 17 for crystal classification, small crystals of the desired size being returned to crystallizer 1 the others to auxiliary heat exchanger 4. Ice nuclei will be formed by natural crystal breakage due to attrition and in most cases this step will not be required.

Although the invention has been described employing separate equipment for circulation, cooling and crystallization functions, it is possible to combine these functions in a single vessel. For example, a vessel can be designed to provide separate areas for cooling, crystallization and agitation. Circulation in such a vessel can be natural or forced, and heat transfer can be direct or indirect.

The practice of the invention involves, as a preliminary step, cooling the extract to a metastable state. This state has been defined as a peculiar state of peudo equilibrium, in which the system has acquired or lost energy beyond that required for its most stable state, yet has not been rendered unstable. Thus, by using great care an extract undercooled below its normal freezing point will not crystallize. In this condition it has lost heat energy to the extent such that it would normally be expected to crystallize spontaneously; and only a slight disturbance will precipitate that change, the disturbance being provided from some external source. While in the metastable state, spontaneous crystallization does not obtain until the metastability is disrupted by the triggering of crystal formation generally due to the creation of a source of nucleation thereby reverting metastability to stability. In the process of the invention a source of nucleation e.g. ice crystals in the crystallizer serve as the external disturbance that precipitates the change.

FIG. II constitutes a general example of the temperature profile of an extract containing initially about 4% by weight of a fruit juice. The extract is first cooled in auxiliary cooler 4 the temperature falling along the vertical line to in the neighborhood of a few degrees above the freezing point of the extract. The extract is then forced by pump 16 at a predetermined velocity, into heat exchanger 2. The heat exchange surfaces of exchanger 2 are so adapted and arranged that the extract is converted to a metastable state as cooling pierces the TFP line short of the nucleation point, NP, line. On approaching line NP the probability of crystallization increases. The growth of crystals results in concentration of the extract and a rise in the temperature due to the heat of fusion. The flow of extract by pump 16 and the flow of the refrigerant by pump 7 are meticulously coordinated and adjusted to effect respectively a discharge of extract by line 15 and heat of fusion by refrigerant in line 15 to the crystallizer 1 while the extract is hovering between the states of metastability and stability. The extract entering crystallization zone 1 changes from a single phase to a two phase environment and the ice crystals provided in crystallizer 1 disturbing metastability and inducing crystallization and crystal growth. The driving force, DF, of crystal growth being the temperature difference between the TFP of the extract, which gradually decreases as the concentration of the extract increases with the formation of crystals and the undercooling of the concentrating extract.

The process of the invention may be conducted by the continuous flow of extract through the equipment, as illustrated, or discontinuously i.e. by a batch process. In accordance with the former equilibrated states are maintained, insofar as it is advisable to do so, throughout the process, and most importantly within the crystallizer zone wherein for the concentration of citrous juice the concentration within crystallizer 1 is maintained substantially constant at about 8% concentration by weight of citrous content and with a 2° F. depression of temperature below the freezing point of that extract (i.e. at a 2° F. driving force), see FIG. II which identifies such a point of equilibrium as EP. The concentration and type of extract being treated determine the EP used; while, therefore, between extracts and concentrations of an extract the EP will vary; for a specific extract and specific concentration it is maintained substantially consant. In accordance with batch operation the concentration of citrous increases while the driving force DF is maintained at a substantially constant value say 2° F. plus or minus 0.5° F. below the freezing point of the extract throughout the batch operation.

Orange juice for sale in the form of frozen juice or as a concentrated juice is prepared by squeezing oranges followed by the customary separation of the pulp and removing water from the resulting juice by the process of the invention. In the process the juice, of 12% concentration by weight with an initial freezing point at 28° F., is chilled in auxilliary heat exchanger 4, is forced at a rate governed by the variable speed pump 16 into head exchanger 2 is cooled therein from the stable monophase state to a metastable monophase state and a temperature of approximately 25° F. by contact with the heat transfer surfaces of the heat exchanger 2, and is quickly transferred through line 15 to crystallizer 1 containing a slurry of extract and ice crystals at a temperature of 27° F. There are present in the heat exchanger from 50 to 500 square feet of heat exchange surface per 1000 pounds of water subsequently removed as ice from the extract per hour in crystallizer 1 which accomplishes the refrigeration.

A feature of the invention is the control of the heat removed from the extract in heat exchanger 2 for the purpose of undercooling the extract to from 0.5° to 10.0° F. and preferably 1.0° to 5.0° F., below the normal freezing point of the extract and into its metastable state. The concentration and kind of extract determines its normal freezing point and the degree of undercooling may approach but not reach below the metastable range as the extract leaves heat exchanger 2. For optimum operation of the process the rate of heat withdrawn by the brine or other refrigerant used is so adjusted and arranged by means of the flow volume and rate of extract and the flow volume, rate and temperature of the circulating refrigerant past the heat exchange surfaces and out of contact with the extract that the metastable state of the extract is attained and not disturbed and its crystallization inhibited until the extract meets the slurry in the crystallizer 1.

Any suitable type of refrigerant may be used. For example, the well known ammonia vapor-pressure type is used to refrigerate circulating brine in line 18 and through heat exchange surfaces of heat exchanger 2, pump 7 being of a variable speed type to permit the control of the amount of heat withdrawn from heat exchanger 2 and from the extract therein.

It has been found that control of crystallization is dependent on the quantity of nuclei present crystallization. With too many nuclei present crystal size is decreased and the reverse is also true. Adjusting the quantity of nuclei, applicant has found, is subject to meticulous control by maintaining the nucleating source under the proper temperature. This may be accomplished, for example, by the heater 20 in line 21. If the quantity of nuclei is too great the nuclei fed by line 21 to crystallizer 1 may be decreased by heating and thereby reducing the nuclei in heater 20 if too few the nuclei fed by line 21 to crystallize may be increased in flow volume and/or by lowering the temperature of the nuclei feed to or in heater 20.

Efficient concentration of comestible, imbibable, and other extracts by the process of the invention stems from the formation during the concentration of granular ice crystals up to about 1 mm. in size and having a high bulk density. Water of course will crystallize in the form of snow-like crystals having an extremely low bulk density. Snow-like crystals will hold tenaciously any retained extract or concentrated solute. An economical process for the concentration of the solutions described herein is operated under close tolerance that avoid the formation of snow-like crystals. The process of the invention produces superior crystals by crystallization in a substantially constant environment in the crystallizer 1. The solute is crystallized and crystals grown, to an average size between about 0.2 and 1.0 mm., the concentration being conducted under strict control of temperature and crystal to volume ratio. Moreover, crystals are produced as discrete particles during their crystallization and growth and are subjected to crystal growth also under strict control and importantly in the practical absence of localized heating and cooling effects due respectively to controlled introduction of the metastable extract and the release of its undercooling in the crystallizer.

The process, apparatus, and conditions described may be modified in many ways within the purview of the invention as herein disclosed and claimed without departing from the invention or without operating outside the scope of the claims.

I claim:
1. In a process for the concentration of an aqueous product by freezing, wherein water is removed from the product as ice crystals, the steps which comprise:
   (a) cooling an original aqueous fluid product to a metastable state, in which the product is undercooled in a monophase environment to a temperature below the normal freezing point of the product, said cooling being conducted by indirect heat exchange with a recirculating refrigeration medium, the aqueous product flowing in a horizontal path upwardly in baffled flow;
   (b) transferring the monophase product while in the undercooled and metastable state to a stabilizing environment that reverts the product to a stable state;
   (c) releasing the undercooling as heat of fusion of ice in the stabilizing environment to form an ice slurry of larger and smaller ice crystals in liquid;
   (d) centrifuging the liquid from the ice slurry;
   (e) washing the ice crystals and separating the washings from the crystals;
   (f) recirculating the centrifuged liquid and the washings from the ice crystals to said original product of step (a);
   (g) centrifuging and screening the washed ice crystals of step (e) to divide the crystals into smaller and larger crystals;
   (h) transferring the smaller ice crystals from step (g) to the stabilizing environment of step (b); and
   (i) recovering the larger crystals of step (g) separate from the original product of step (a).

2. The process of claim 1 in which the metastable and monophase extract of step (a) is transferred to an environment in which nucleation, crystallization and crystal growth of ice separates water from and concentrates the product.

3. The process of claim 1 in which the product is a comestible selected from the class consisting of vegetables, fruits, and seed.

4. The process of claim 1 in which the undercooling of step (a) is carried to from 0.5° to 5.0° F. below the normal freezing point of the product.

5. The process of claim 1 in which the flow of nuclei to the stabilizing environment is adjusted and arranged to control the amount of nuclei for the production of ice crystals having an average size between 0.2 and 1 mm.

References Cited by the Examiner

UNITED STATES PATENTS

| | | | |
|---|---|---|---|
| 2,013,025 | 9/1935 | Bottoms | 62—58 X |
| 2,672,487 | 3/1954 | Tegge. | |
| 2,735,779 | 2/1956 | Wenzelberger | 62—58 |
| 2,854,494 | 9/1958 | Thomas | 62—58 |
| 2,881,230 | 4/1959 | Bvell. | |
| 2,896,419 | 7/1959 | Thompson | 62—58 |
| 2,945,903 | 7/1960 | Findlay. | |
| 3,017,751 | 1/1962 | Hawkins | 62—58 |
| 3,098,734 | 7/1963 | Svanoe | 62—58 |
| 3,146,951 | 9/1964 | Brown. | |

FOREIGN PATENTS 841,374  7/1960  Great Britain.

NORMAN YUDKOFF, *Primary Examiner.*